(12) United States Patent
Yasuda

(10) Patent No.: US 7,515,200 B2
(45) Date of Patent: Apr. 7, 2009

(54) IMAGE SENSING APPARATUS, FOCUS ADJUSTMENT METHOD, AND FOCUS ADJUSTMENT COMPUTER CONTROL PROGRAM

(75) Inventor: Hitoshi Yasuda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 950 days.

(21) Appl. No.: 10/215,948

(22) Filed: Aug. 9, 2002

(65) Prior Publication Data

US 2003/0048372 A1    Mar. 13, 2003

(30) Foreign Application Priority Data

Aug. 10, 2001   (JP)   .............. 2001-244329

(51) Int. Cl.
H04N 5/232   (2006.01)
(52) U.S. Cl. ....................... 348/354; 348/349
(58) Field of Classification Search ............... 348/345, 348/354, 356, 349
See application file for complete search history.

(56) References Cited

U.S. PATENT DOCUMENTS

| | | | | |
|---|---|---|---|---|
| 5,619,300 | A * | 4/1997 | Watanabe et al. | ............. 396/95 |
| 6,028,981 | A * | 2/2000 | Hirasawa et al. | ............ 386/117 |
| 6,137,102 | A | 10/2000 | Späth et al. | .............. 250/214.1 |
| 6,163,340 | A * | 12/2000 | Yasuda | ........................ 348/345 |
| 6,373,525 | B1 * | 4/2002 | Nishiyama | ................... 348/345 |
| 6,727,949 | B1 * | 4/2004 | Saruwatari et al. | .......... 348/349 |
| 6,788,345 | B1 * | 9/2004 | Okamura | ..................... 348/371 |

FOREIGN PATENT DOCUMENTS

| | | |
|---|---|---|
| JP | 63-110412 | 5/1988 |
| JP | 02-181126 | 7/1990 |
| JP | 04-349416 | 12/1992 |
| JP | 06-141223 | 5/1994 |
| JP | 07-067027 | 3/1995 |
| JP | 07-298120 | 11/1995 |
| JP | 7-298120 | 11/1995 |
| JP | 08-075984 | 3/1996 |
| JP | 09-015488 | 1/1997 |
| JP | 10-221594 | 8/1998 |
| JP | 11-069223 | 3/1999 |
| JP | 2000-224458 | 8/2000 |
| JP | 2001-208963 | 8/2001 |
| TW | 380251 | 10/1998 |

OTHER PUBLICATIONS

Japanese Office Action dated Jan. 16, 2004.

* cited by examiner

*Primary Examiner*—David L Ometz
*Assistant Examiner*—Luong T Nguyen
(74) *Attorney, Agent, or Firm*—Locke Lord Bissell & Liddell, LLP

(57) ABSTRACT

An apparatus configured to optimize autofocus performance in photographing a still picture includes a focus adjusting device configured to detect a position of a focus lens in accordance with movement of the focus lens, a designating device which designates still picture photography, a control device which causes the focus adjusting device to operate in one of a first mode in which said focus adjusting device maintains a current in-focus position when the designating device is operated, and a second mode in which said focus adjusting device adjusts the position of the focus lens to obtain an in-focus position when said designating device is operated.

14 Claims, 17 Drawing Sheets

PRIOR ART

PRIOR ART

PRIOR ART

IMAGE SENSING APPARATUS, FOCUS ADJUSTMENT METHOD, AND FOCUS ADJUSTMENT COMPUTER CONTROL PROGRAM

FIELD OF THE INVENTION

The present invention relates to an image sensing apparatus for various video cameras and, more particularly, to an autofocus adjustment technique in photographing a still picture.

BACKGROUND OF THE INVENTION

In AF (AutoFocus) devices for recent video cameras, the following focus adjustment method is a mainstream. That is, the sharpness of a frame is detected from a video signal obtained by photoelectrically converting an object image by an image sensing element or the like. The sharpness is set as an AF evaluation value, and movement of a focus lens is so controlled as to maximize the AF evaluation value.

In general, the AF evaluation value is the voltage level of the high-frequency component of a video signal extracted by a bandpass filter having a given band. When a normal object image is photographed, the voltage level (focus voltage level) of the high-frequency component of the video signal increases its voltage level value as the image is set in an in-focus state, as shown in FIG. 2. A point where the voltage level value maximizes is an in-focus position.

The hardware arrangement of an actual video camera will be described in detail with reference to FIG. 1.

In FIG. 1, reference numeral 101 denotes a fixed first lens group; 102, a zoom lens which performs zooming; 103, a stop; 104, a fixed second lens group; and 105, a focus compensation lens (to be referred to as a focus lens hereinafter) having a function of correcting movement of a focal plane along with zooming operation and a focusing function.

Reference numeral 106 denotes an image sensing element (CCD); 107, an AGC which amplifies an output from the CCD 106; and 108, a camera signal processing circuit which converts output signals from the AGC 107 into signals corresponding to a moving picture recording device 109 and still picture recording device 116 (to be described below). The moving picture recording device 109 uses a magnetic tape as a recording medium, and the still picture recording device 116 uses a semiconductor memory as a recording medium.

Reference numerals 110 and 112 denote motors for moving the zoom lens 102 and focus lens 105; 111 and 113, drivers which drive the motors 110 and 112 in accordance with signals from a camera AF microcomputer 115 (to be described below); and 114, an AF evaluation value processing circuit which extracts, from an output signal from the CCD 106, a high-frequency component and luminance difference component (difference between the maximum and minimum values of the luminance level of a video signal) used to perform focus detection.

The AF microcomputer 115 controls the motors 110 and 112 via the drivers 111 and 113 on the basis of output signals from the AF evaluation value processing circuit 114. The AF microcomputer 115 also performs various types of control such that the recording destination of an output signal from the camera signal processing circuit 108 is switched to the moving picture recording device 109 or still picture recording device 116 in accordance with ON operations of a moving picture trigger switch 117 and still picture release switch 118.

The AF microcomputer 115 comprises a CPU 115a, ROM 115b, and RAM 115c. The CPU 115a executes various processes on the basis of control programs (including control programs corresponding to flow charts (to be described later)) stored in the ROM 115b. At this time, the CPU 115a uses the RAM 115c as a work area or the like.

In the camera system having the arrangement shown in FIG. 1, the AF microcomputer 115 automatically adjusts the focus by moving the focus lens 105 so as to maximize the output signal level of the AF evaluation value processing circuit 114. The AF microcomputer 115 issues a recording instruction to the moving picture recording device 109 upon reception of a moving picture trigger signal upon ON operation of the moving picture trigger switch 117. The AF microcomputer 115 issues a recording instruction to the still picture recording device 116 upon reception of a release signal upon ON operation of the still picture release switch 118.

AF control by the AF microcomputer 115 in photographing a moving picture will be explained in detail with reference to FIGS. 3 to 7.

After moving picture AF processing starts (step S301), the CPU 115a of the AF microcomputer 115 finely drives the focus lens 105 (step S302). Fine driving processing will be described in detail later with reference to FIG. 4. Then, the CPU 115a checks whether the focus lens 105 is in focus by fine driving (step S303). If NO in step S303, the CPU 115a checks whether the in-focus direction is determined by fine driving (step S304).

If NO in step S304, the CPU 115a returns to step S302. If YES in step S304, the CPU 115a advances to step S305, and performs so-called hill-climbing driving of moving the focus lens 105 at a high speed in a direction in which the AF evaluation value increases. Hill-climbing driving processing will be described in detail later with reference to FIG. 6. The CPU 115a checks whether the AF evaluation value exceeds its peak by hill-climbing driving (step S306). If NO in step S306, the CPU 115a returns to step S305, and continues hill-climbing driving.

If YES in step S306, the CPU 115a drives the focus lens 105 in an opposite direction in order to return the AF evaluation value to its peak during hill-climbing driving (step S307). Then, the CPU 115a checks whether the AF evaluation value reaches its peak (step S308). If NO in step S308, the CPU 115a returns to step S307, and continues the operation of returning the AF evaluation value to its peak. If YES in step S308, the CPU 115a returns to step S302, finely drives the focus lens 105, and searches for the in-focus position of the next moving picture.

If YES in step S303, the CPU 115a stores an AF evaluation value for an in-focus state in the RAM 115c (step S309), and performs reactivation determination processing for moving picture AF operation (step S310). In reactivation determination processing, the CPU 115a compares the current AF evaluation value stored in step S309 with the previous AF evaluation value, and if the values are different by a predetermined level or more, the CPU 115a determines that the focus lens 105 must be reactivated.

The CPU 115a checks whether the focus lens 105 is determined to be reactivated in reactivation determination processing (step S311). If YES in step S311, the CPU 115a returns to step S302, and restarts fine driving operation in order to execute AF processing for the next moving picture. If NO in step S311, the CPU 115a stops the focus lens 105 (step S312). The CPU 115a returns to step S310 in order to perform AF control for subsequent moving pictures, and continues reactivation determination processing.

Details of fine driving processing in step S302 of FIG. 3 will be explained with reference to the flow chart of FIG. 4, and FIG. 5.

After fine driving processing starts (step S401), the CPU 115a receives an AF evaluation value from the AF evaluation value processing circuit 114 (step S402). The CPU 115a checks whether the current AF evaluation value received in step S402 is larger than the previous AF evaluation value (step S403).

If NO in step S403, the CPU 115a advances to step S404, and moves the focus lens 105 by a predetermined amount in an opposite direction. If YES in step S403, the CPU 115a advances to step S405, and moves the focus lens 105 by a predetermined amount in the current direction (forward/backward direction).

After the process in step S404 or S405, the CPU 115a checks whether the direction determined as an in-focus direction is kept unchanged successively a predetermined number of times or more, i.e., whether the focus lens 105 moves in the same direction successively a predetermined number of times or more (step S406).

If YES in step S406, the CPU 115a sets that the moving direction of the focus lens 105 for an in-focus state can be determined (step S407), and ends fine driving processing. When fine driving processing ends through this route, hill-climbing driving in step S305 of FIG. 3 is executed.

If NO in step S406, the CPU 115a checks whether the focus lens 105 repeats direction reversal a predetermined number of times or more in almost the same area (step S408). If NO in step S408, this means that the focus lens 105 has not reached the vicinity of an in-focus position. The CPU 115a returns to step S402, and continues fine driving processing.

If YES in step S408, this means that the focus lens 105 has reached the vicinity of an in-focus position (step S409), and the CPU 115a ends fine driving processing. When fine driving processing ends through this route, the reactivation determination routine in step S310 of FIG. 3 is executed.

The processes in steps S403 to S405 will be described with reference to FIG. 5.

In FIG. 5, the CPU 115a receives at a timing $T_A$ an AF evaluation value A for charges (image signal) accumulated in the CCD 106 during a period A, and receives at a timing $T_B$ an AF evaluation value B for an image signal accumulated in the CCD 106 during a period B. At the timing $T_B$, the CPU 115a compares the AF evaluation values A and B, if A<B holds, keeps moving the focus lens 105 in the forward direction (current direction), and if A>B holds, moves the focus lens 105 in an opposite direction.

Details of hill-climbing driving processing in step S305 of FIG. 3 will be explained with reference to the flow chart of FIG. 6, and FIG. 7.

After hill-climbing processing starts (step S601), the CPU 115a receives an AF evaluation value from the AF evaluation value processing circuit 114 (step S602). The CPU 115a checks whether the current AF evaluation value received in step S602 is larger than the previous AF evaluation value (step S603).

If YES in step S603, the CPU 115a drives the focus lens 105 in the forward direction at a predetermined speed (step S604), and returns to step S602.

If NO in step S603, the CPU 115a checks whether the AF evaluation value exceeds its peak (step S605). If the AF evaluation value does not exceed its peak, i.e., the current AF evaluation value becomes equal to or smaller than the previous AF evaluation value though the AF evaluation value does not exceed its peak, the AF microcomputer 115 determines that the direction is not correct, drives the focus lens 105 in an opposite direction at a predetermined speed (step S606), and returns to step S602.

If the AF evaluation value exceeds its peak, i.e., the current AF evaluation value becomes equal to or smaller than the previous AF evaluation value as a result of exceeding the peak of the AF evaluation value, the CPU 115a determines that an in-focus point exists, and ends hill-climbing driving processing (step S607). When hill-climbing processing ends in this manner, fine driving processing is executed in step S302 of FIG. 3.

The significance of the processes in steps S605 to S607 of FIG. 6 will be supplemented with reference to FIG. 7.

In FIG. 7, the upper MA decreases the AF evaluation value over the peak. The CPU 115a determines that an in-focus point exists and the focus lens 105 has passed through the in-focus point. Thus, the CPU 115a ends hill-climbing operation, and shifts to fine driving processing. The lower MB decreases the AF evaluation value without any peak. The CPU 115a determines that the moving direction of the focus lens 105 is not correct, reverses the moving direction, and continues hill-climbing operation.

As described above, the camera AF microcomputer 115 always maximizes the AF evaluation value by controlling movement of the focus lens 105 while repeating reactivation determination→fine driving→hill-climbing driving→fine driving→reactivation determination.

Japanese Patent Laid-Open No. 07-298120 proposes a method of normalizing an AF evaluation value by a luminance difference component and determining an in-focus degree. This method exploits the fact that the ratio of the luminance difference component and a high-frequency component serving as an AF evaluation value is constant at an in-focus point. If the ratio is a predetermined value or more, the focus lens is close to an in-focus point. If the ratio is very low, the focus lens is greatly in an out-of-focus state. In other words, an in-focus state can be determined to a certain extent from the ratio of the maximum value of the luminance difference component and the AF evaluation value. The determination result is used to tune the amplitude in fine driving (vibrations or reciprocation) or the speed in hill-climbing driving.

In recent years, video cameras having a still picture photographing mode have been implemented. In AF processing in photographing a still picture by this video camera, the focus lens 105 is moved in accordance with release operation for still picture photography to a lens position corresponding to the maximum AF evaluation value which has already been obtained by moving picture AF processing. Alternatively, in-focus control is performed again.

The former conventional AF processing in still picture photography will be explained with reference to the flow chart of FIG. 16.

After AF processing starts (step S1601), the CPU 115a of the AF microcomputer 115 executes AF processing in moving picture photography that has been described with reference to FIGS. 3 to 7 (step S1602). The CPU 115a checks whether the still picture release switch 118 has been turned on to input a still picture release signal (step S1603). If NO in step S1603, the CPU 115a returns to step S1602, and continues AF processing in moving picture photography.

If YES in step S1603, the CPU 115a moves the focus lens 105 to a position corresponding to the maximum AF evaluation value obtained by the preceding AF processing in moving picture photography (step S1604). The CPU 115a records a still picture by controlling the camera signal processing circuit 108 and still picture recording device 116 (step S1605), and ends AF processing in still picture photography (step S1606).

The latter conventional AF processing in still picture photography will be described with reference to the flow chart of FIG. 17.

After AF processing starts (step S1701), the CPU 115a of the AF microcomputer 115 executes AF processing in moving picture photography that has been described with reference to FIGS. 3 to 7 (step S1702). The CPU 115a checks whether the still picture release switch 118 has been turned on to input a still picture release signal (step S1703). If NO in step S1703, the CPU 115a returns to step S1702, and continues AF processing in moving picture photography.

If YES in step S1703, the CPU 115a moves the focus lens 105 to the closest focusing (wide-angle) direction at a high speed (step S1704), and checks whether the AF evaluation value decreases (step S1705). If NO in step S1705, the CPU 115a returns to step S1704, and continues lens moving processing to the closest focusing direction.

If YES in step S1705, the CPU 115a moves the focus lens 105 to the infinity (telephoto) direction at a high speed (step S1706). The CPU 115a monitors changes in AF evaluation value, and checks whether the AF evaluation value exceeds its peak (step S1707). If NO in step S1707, the CPU 115a returns to step S1706, and continues lens moving processing to the infinity direction.

If YES in step S1707, the CPU 115a moves the focus lens 105 to the peak position (in-focus position) (step S1708). The CPU 115a performs fine driving in FIG. 4 to search for an accurate peak position (step S1709). Fine driving processing is done in consideration of a case in which an actual in-focus position includes an error even if a peak position is detected during high-speed driving, or a case in which an object to be photographed moves.

The CPU 115a checks whether a peak position has been detected by fine driving processing of step S1709 (step S1710). If NO in step S1710, the CPU 115a returns to step S1709, and repeats fine driving processing.

If YES in step S1710, the CPU 115a moves the focus lens 105 to the peak position (step S1711). The CPU 115a records a still picture by controlling the camera signal processing circuit 108 and still picture recording device 116 (step S1712), and ends AF processing in still picture photography (step S1713).

This prior art suffers the following problems. The moving time is short when the focus lens 105 is moved in accordance with release operation for still picture photography to a lens position corresponding to the maximum AF evaluation value obtained by the preceding moving picture AF processing. If the lens position corresponding to the maximum AF evaluation value obtained by moving picture AF processing is not an in-focus position, a blurred still picture is captured.

When in-focus control is newly executed though the lens position corresponding to the maximum AF evaluation value obtained by moving picture AF processing is an in-focus position, a predetermined time is necessarily required till reception of an image, undesirably generating a shutter time lag.

SUMMARY OF THE INVENTION

The present invention has been made to overcome the conventional drawbacks, and has as its object to improve the autofocus performance in photographing a still picture.

To solve the above-described problems and achieve the above object, an apparatus according to the first aspect of the present invention has the following arrangement.

That is, the apparatus comprises (A) a designating device which designates still picture photography, (B) a determining device which determines a focus adjustment state by a focus adjusting device when the designating device is operated, and (C) a control device which causes the focus adjusting device to perform at least two operations in accordance with the focus adjustment state determined by the determining device.

An apparatus according to the second aspect of the present invention has the following arrangement.

That is, the apparatus comprises (A) a designating device which designates still picture photography, (B) a determining device which determines a focus adjustment state by a focus adjusting device when the designating device is operated, and (C) a deciding device which decides, in accordance with the focus adjustment state determined by the determining device, whether first focus adjustment operation performed by the focus adjusting device before the designating device is operated is used for still picture photography, or second focus adjustment operation different from the first focus adjustment operation performed by the focus adjusting device after the designating device is operated is used for still picture photography.

An apparatus according to the third aspect of the present invention has the following arrangement.

That is, the apparatus comprises (A) a designating device which designates still picture photography, (B) a determining device which determines a focus adjustment state by a focus adjusting device when the designating device is operated, and (C) a deciding device which decides, in accordance with the focus adjustment state determined by the determining device, whether first focus adjustment operation performed by the focus adjusting device before the designating device is operated is used for still picture photography, or second focus adjustment operation newly performed independently of the first focus adjustment operation by the focus adjusting device after the designating device is operated is used for still picture photography.

A focus adjustment method according to the first aspect of the present invention has the following step.

That is, the focus adjustment method comprises the steps of determining a focus adjustment state by a focus adjusting device when an operation of designating still picture photography is done, and causing the focus adjusting device to perform at least two operations in accordance with the determined focus adjustment state.

A focus adjustment method according to the second aspect of the present invention has the following step.

That is, the focus adjustment method comprises the steps of determining a focus adjustment state by a focus adjusting device when an operation of designating still picture photography is done, and deciding, in accordance with the determined focus adjustment state, whether first focus adjustment operation performed by the focus adjusting device before the designating operation is done is used for still picture photography, or second focus adjustment operation different from the first focus adjustment operation performed by the focus adjusting device after the designating operation is done is used for still picture photography.

A focus adjustment method according to the third aspect of the present invention has the following step.

That is, the focus adjustment method comprises the steps of determining a focus adjustment state by a focus adjusting device when an operation of designating still picture photography is done, and deciding, in accordance with the determined focus adjustment state, whether first focus adjustment operation performed by the focus adjusting device before the designating operation is done is used for still picture photography, or second focus adjustment operation newly performed independently of the first focus adjustment operation by the focus adjusting device after the designating operation is done is used for still picture photography.

A focus adjustment computer control program according to the first aspect of the present invention has the following program codes.

That is, the focus adjustment computer control program comprises program codes of determining a focus adjustment state by a focus adjusting device when an operation of designating still picture photography is done, and causing the focus adjusting device to perform at least two operations in accordance with the determined focus adjustment state.

A focus adjustment computer control program according to the second aspect of the present invention has the following program codes.

That is, the focus adjustment computer control program comprises program codes of determining a focus adjustment state by a focus adjusting device when an operation of designating still picture photography is done, and deciding, in accordance with the determined focus adjustment state, whether first focus adjustment operation performed by the focus adjusting device before the designating operation is done is used for still picture photography, or second focus adjustment operation different from the first focus adjustment operation performed by the focus adjusting device after the designating operation is done is used for still picture photography.

A focus adjustment computer control program according to the third aspect of the present invention has the following program codes.

That is, the focus adjustment computer control program comprises program codes of determining a focus adjustment state by a focus adjusting device when an operation of designating still picture photography is done, and deciding, in accordance with the determined focus adjustment state, whether first focus adjustment operation performed by the focus adjusting device before the designating operation is done is used for still picture photography, or second focus adjustment operation newly performed independently of the first focus adjustment operation by the focus adjusting device after the designating operation is done is used for still picture photography.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Figure 1:
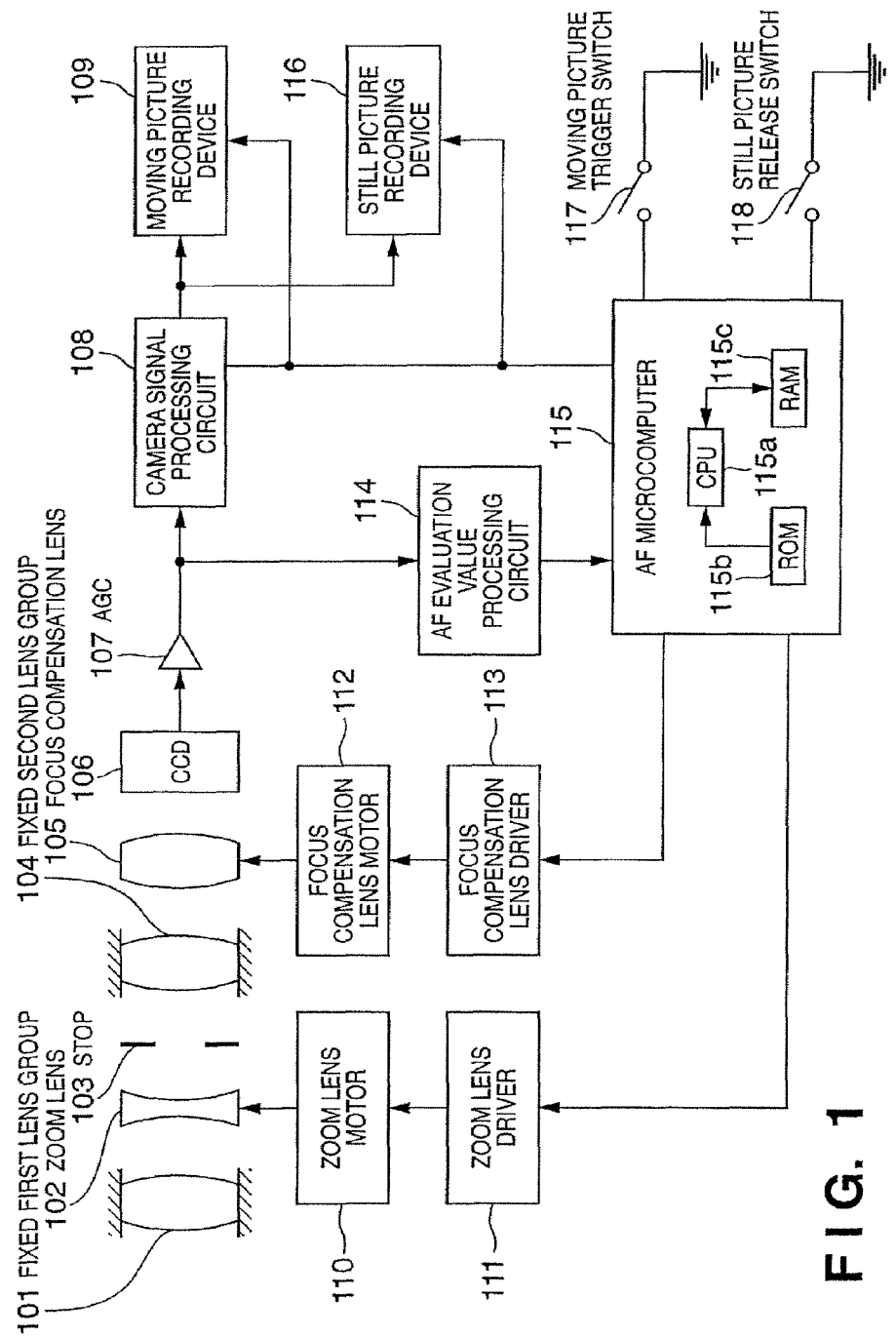
FIG. 1 is a block diagram showing the hardware arrangement of a video camera to which the present invention is applied.
Figure 2:
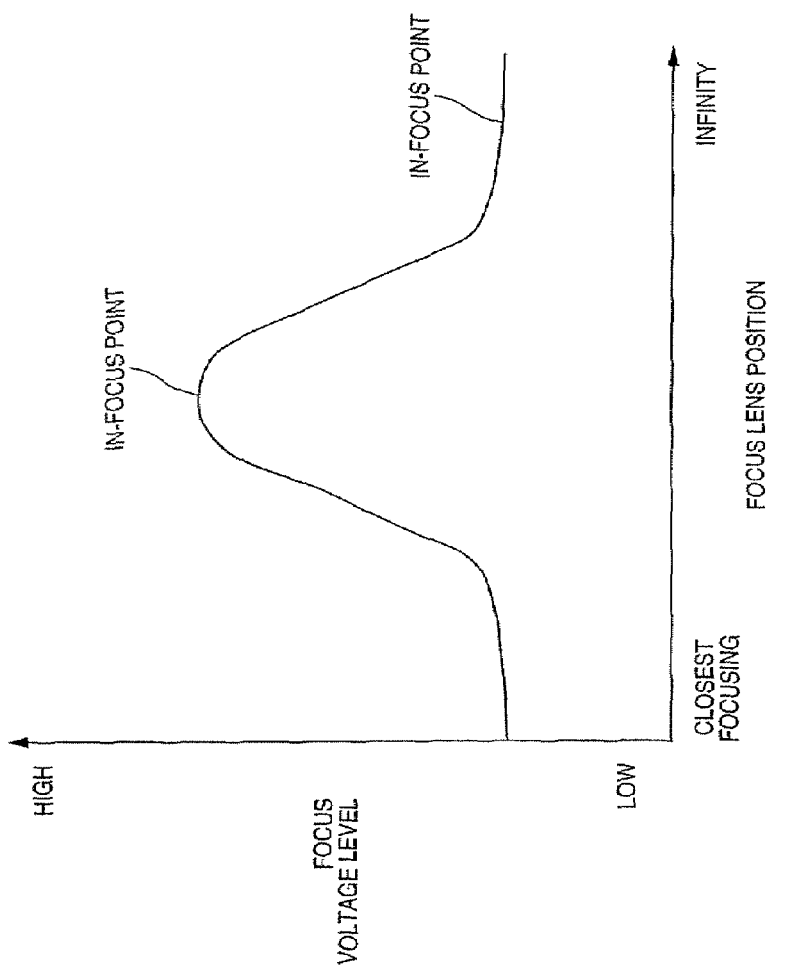
FIG. 2 is a graph for explaining an AF evaluation value.
Figure 3:
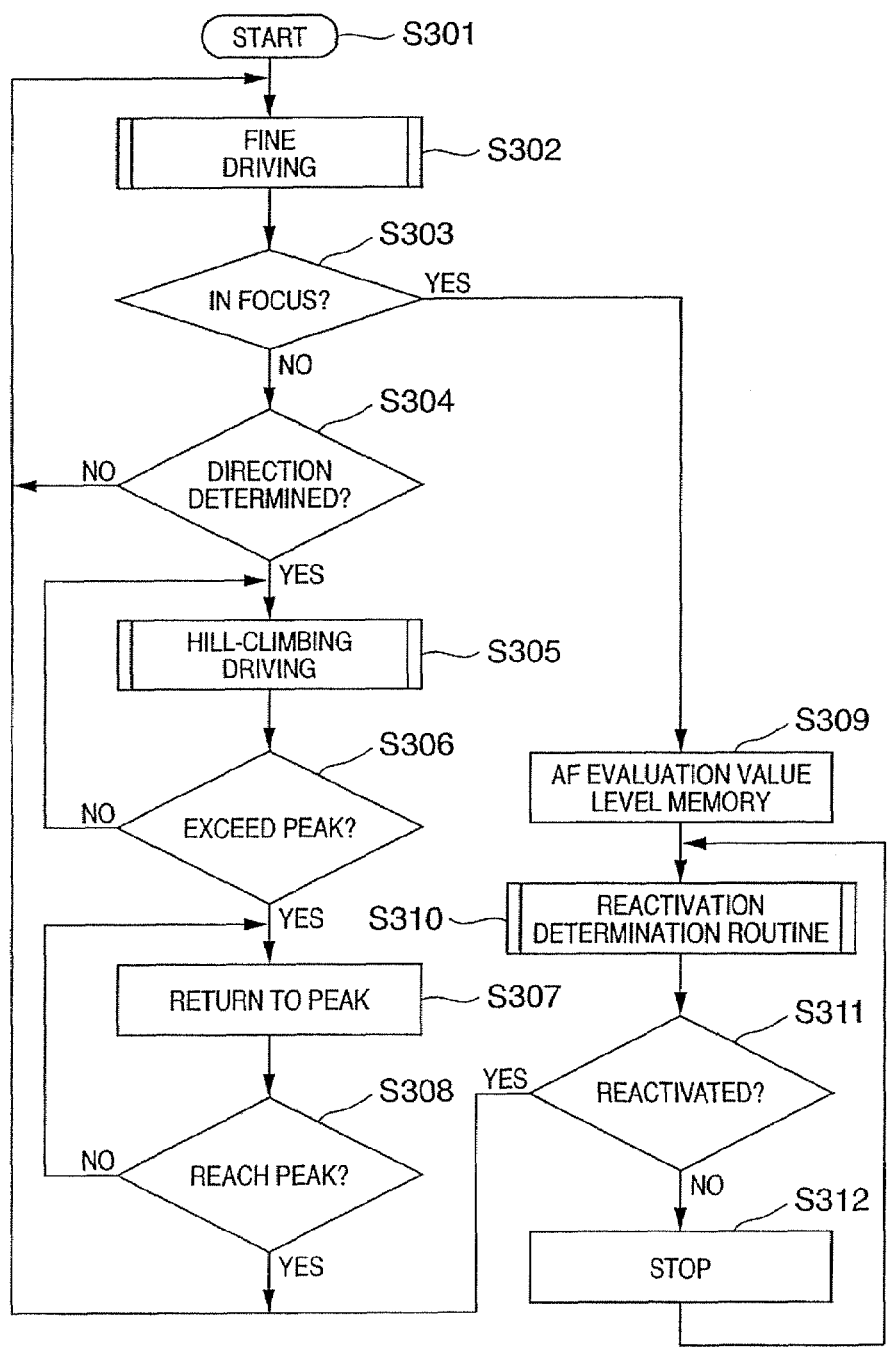
FIG. 3 is a flow chart schematically showing AF processing in moving picture photography.

Preferred embodiments of the present invention will be described below with reference to the accompanying drawings. The following embodiments are applied to a video camera having a still picture photographing mode. The hardware arrangement of the video camera is the same as that shown in FIG. 1, and a description thereof will be omitted.

First Embodiment

Figure 8:
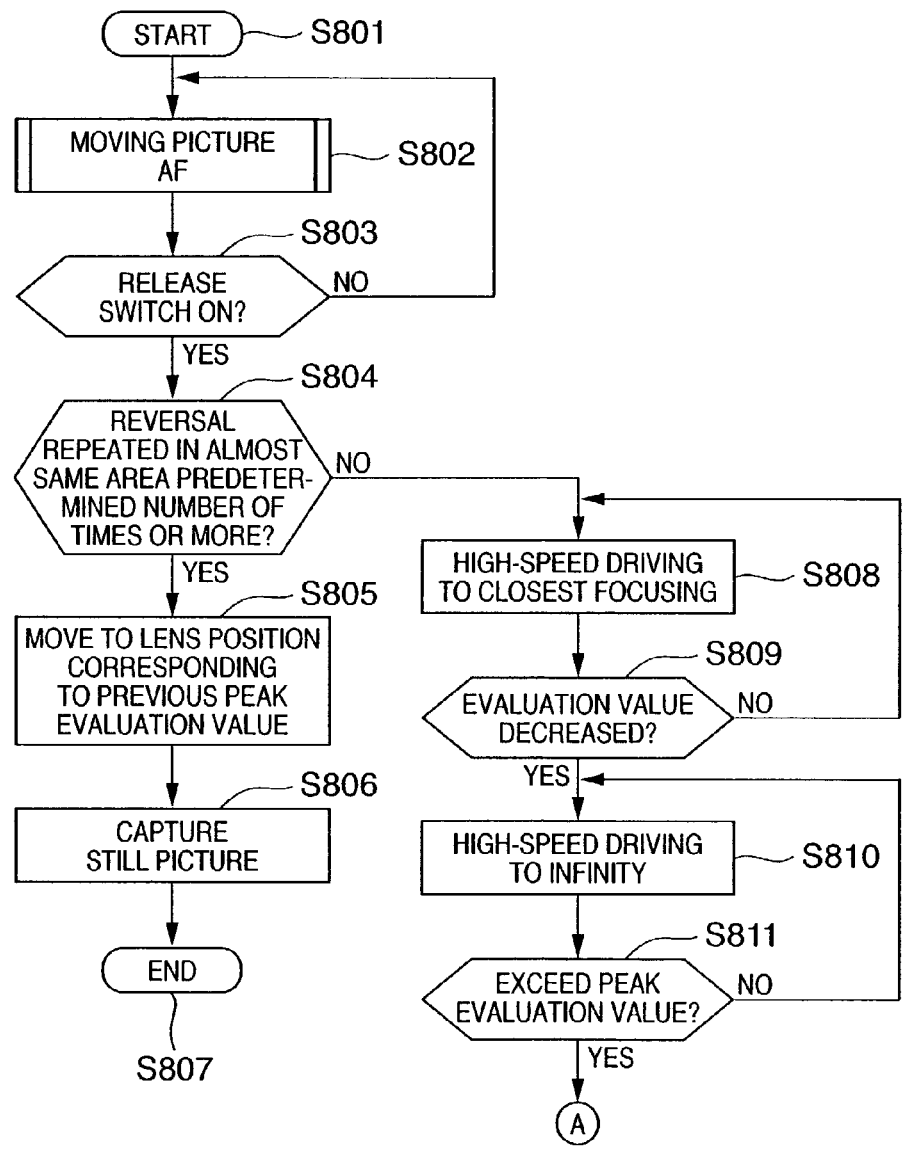
FIG. 8 is a flow chart showing AF processing in still picture photography according to the first embodiment of the present invention.
Figure 9:
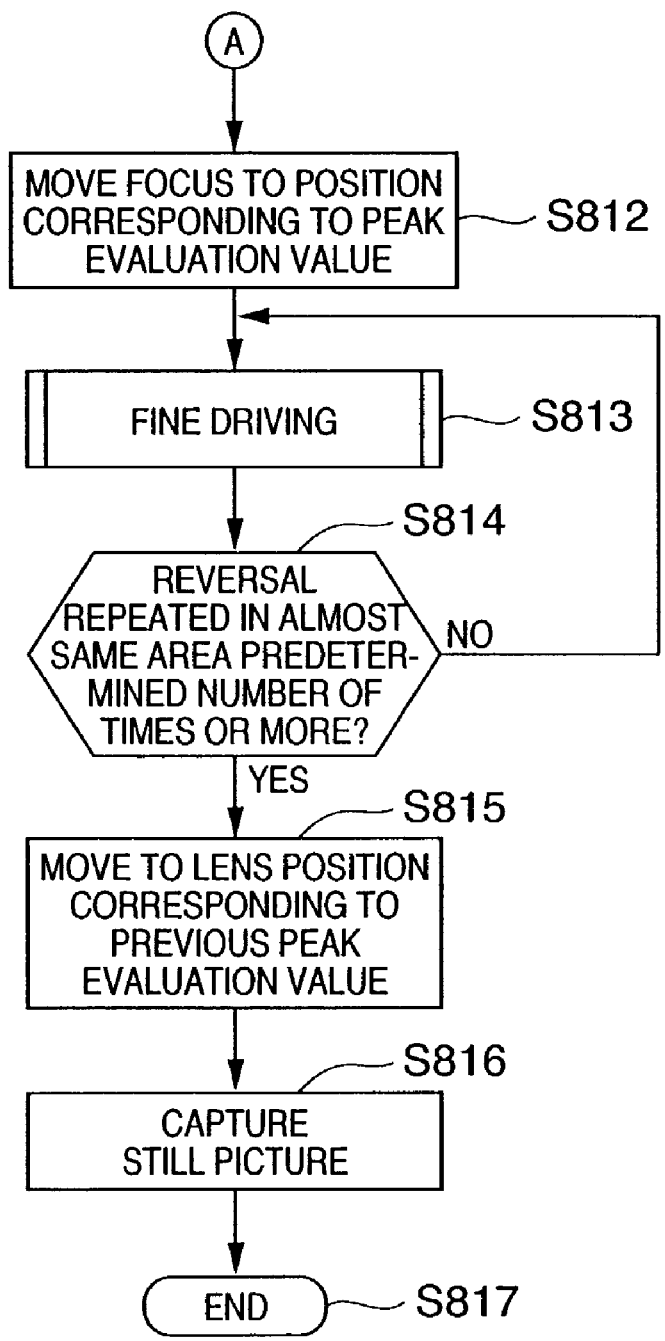
FIG. 9 is a flow chart subsequent to FIG. 8.

AF processing in still picture photography according to the first embodiment will be described with reference to the flow charts of FIGS. 8 and 9.

After AF processing starts (step S801), a CPU 115*a* of an AF microcomputer 115 performs AF processing in moving picture photography described with reference to FIGS. 3 to 7 (step S802). The CPU 115*a* checks whether a still picture release switch 118 has been turned on to input a still picture release signal (step S803). If NO in step S803, the CPU 115*a* returns to step S802, and continues AF processing in moving picture photography.

If YES in step S803, the CPU 115*a* checks whether a focus lens 105 stays in almost the same area for a predetermined time or longer in AF processing in moving picture photography, in other words, whether the focus lens 105 repeats direction reversal a predetermined number of times or more in almost the same area (step S804).

If YES in step S804, this means that an in-focus position has been detected by the preceding AF processing in moving picture photography. The CPU 115*a* moves the focus lens 105 to a position corresponding to the maximum AF evaluation value obtained by the preceding AF processing in moving picture photography (step S805). The CPU 115*a* records a still picture by controlling a camera signal processing circuit 108 and still picture recording device 116 (step S806), and ends AF processing in still picture photography (step S807).

If NO in step S804, this means that any in-focus position has not been detected yet by the preceding AF processing in moving picture photography. The CPU 115*a* moves the focus lens 105 to the closest focusing (wide-angle) direction at a high speed (step S808), and checks whether the AF evaluation value decreases (step S809). If NO in step S809, the CPU 115*a* returns to step S808, and continues lens moving processing to the closest focusing direction.

If YES in step S809, the CPU 115*a* moves the focus lens 105 to the infinity (telephoto) direction at a high speed (step S810). The CPU 115*a* monitors changes in AF evaluation value, and checks whether the AF evaluation value exceeds its peak (step S811). If NO in step S811, the CPU 115a returns to step S810, and continues lens moving processing to the infinity direction.

If YES in step S811, the CPU 115a moves the focus lens 105 to the peak position (in-focus position) (step S812). The CPU 115a performs fine driving in FIG. 4 to search for a peak position (step S813).

Fine driving processing is done in consideration of a case in which an actual in-focus position includes an error even if a peak position is detected during high-speed driving, or a case in which an object to be photographed moves.

Then, the CPU 115a checks whether the focus lens 105 repeats direction reversal a predetermined number of times or more in almost the same area in fine driving processing of step S813 (step S814). If NO in step S814, this means that any in-focus position has not been detected yet by fine driving processing of step S813. The CPU 115a returns to step S813, and continues fine driving processing.

If YES in step S814, this means that an in-focus position has been detected by fine driving processing of step S813. The CPU 115a moves the focus lens 105 to a lens position corresponding to the maximum AF evaluation value obtained by fine driving processing (step S815). The CPU 115a records a still picture by controlling the camera signal processing circuit 108 and still picture recording device 116 (step S816), and ends AF processing in still picture photography (step S817).

In the first embodiment, when an in-focus position is considered to be detected by the preceding moving picture AF processing upon reception of a still picture photographing/recording instruction, the focus lens 105 is quickly moved to the in-focus position, AF processing is stopped, and a still picture is recorded. The first embodiment can, therefore, realize photography free from any shutter time lag.

If an in-focus position is considered not to be detected by the preceding moving picture AF processing upon reception of a still picture photographing/recording instruction, an in-focus position is immediately detected, the focus lens 105 is moved to the in-focus position, AF processing is stopped, and a still picture is recorded, thereby preventing recording any blurred still picture.

Second Embodiment

Figure 10:
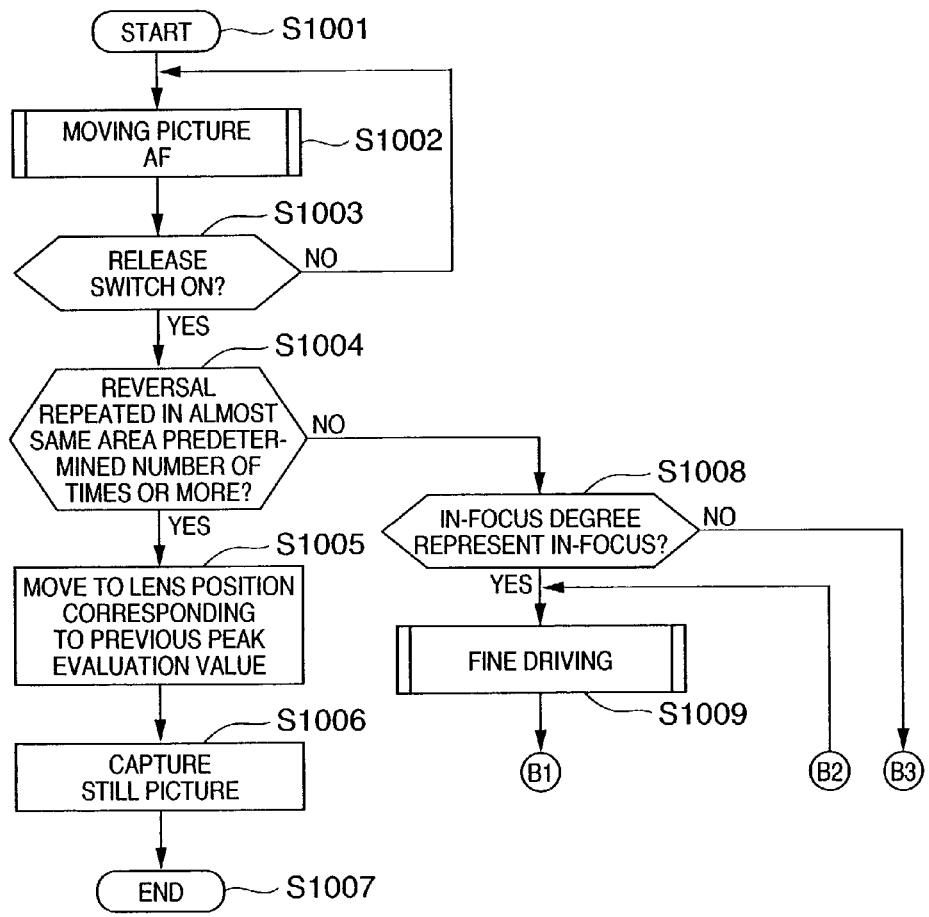
FIG. 10 is a flow chart showing AF processing in still picture photography according to the second embodiment of the present invention.
Figure 11:
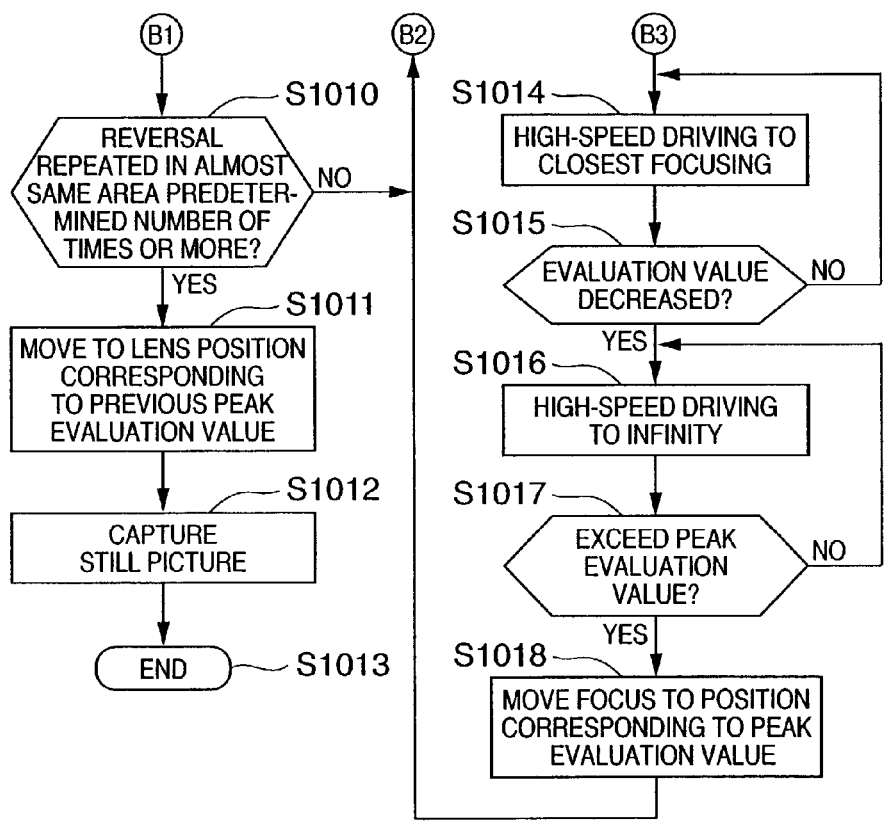
FIG. 11 is a flow chart subsequent to FIG. 10.

AF processing in still picture photography according to the second embodiment will be described with reference to the flow charts of FIGS. 10 and 11.

After AF processing starts (step S1001), a CPU 115a of an AF microcomputer 115 performs AF processing in moving picture photography described with reference to FIGS. 3 to 7 (step S1002). The CPU 115a checks whether a still picture release switch 118 has been turned on to input a still picture release signal (step S1003). If NO in step S1003, the CPU 115a returns to step S1002, and continues AF processing in moving picture photography.

If YES in step S1003, the CPU 115a checks whether a focus lens 105 stays in almost the same area for a predetermined time or longer in AF processing in moving picture photography, in other words, whether the focus lens 105 repeats direction reversal a predetermined number of times or more in almost the same area (step S1004).

If YES in step S1004, this means that an in-focus position has been detected by the preceding AF processing in moving picture photography. The CPU 115a moves the focus lens 105 to a position corresponding to the maximum AF evaluation value obtained by the preceding AF processing in moving picture photography (step S1005). The CPU 115a records a still picture by controlling a camera signal processing circuit 108 and still picture recording device 116 (step S1006), and ends AF processing in still picture photography (step S1007).

If NO in step S1004, the CPU 115a advances to step S1008, and checks whether the current lens position is near an in-focus position. This determination processing is performed based on the ratio of a luminance difference component and high-frequency component.

Figure 4:
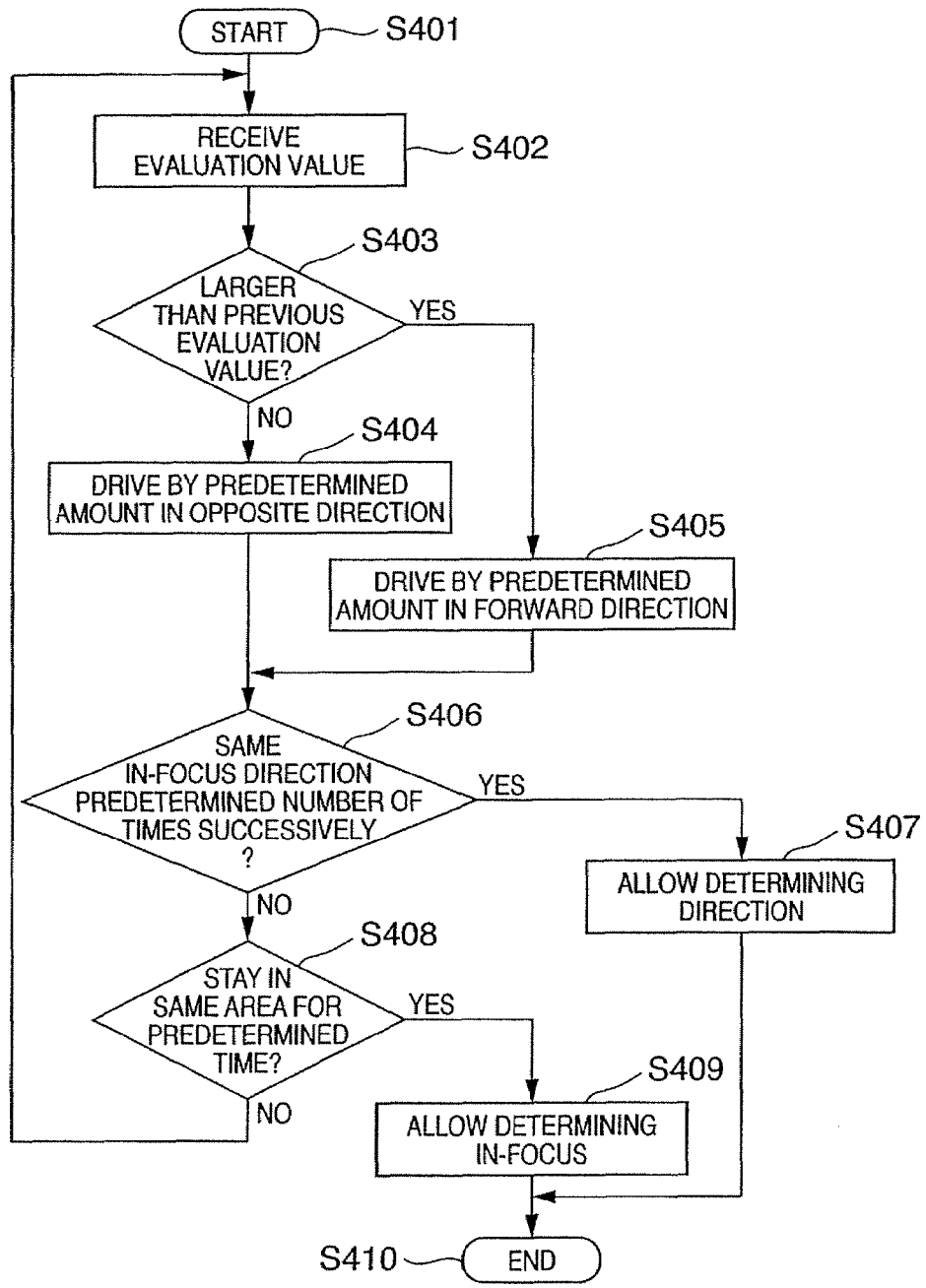
FIG. 4 is a flow chart showing fine driving processing of a focus lens in AF processing.
Figure 5:
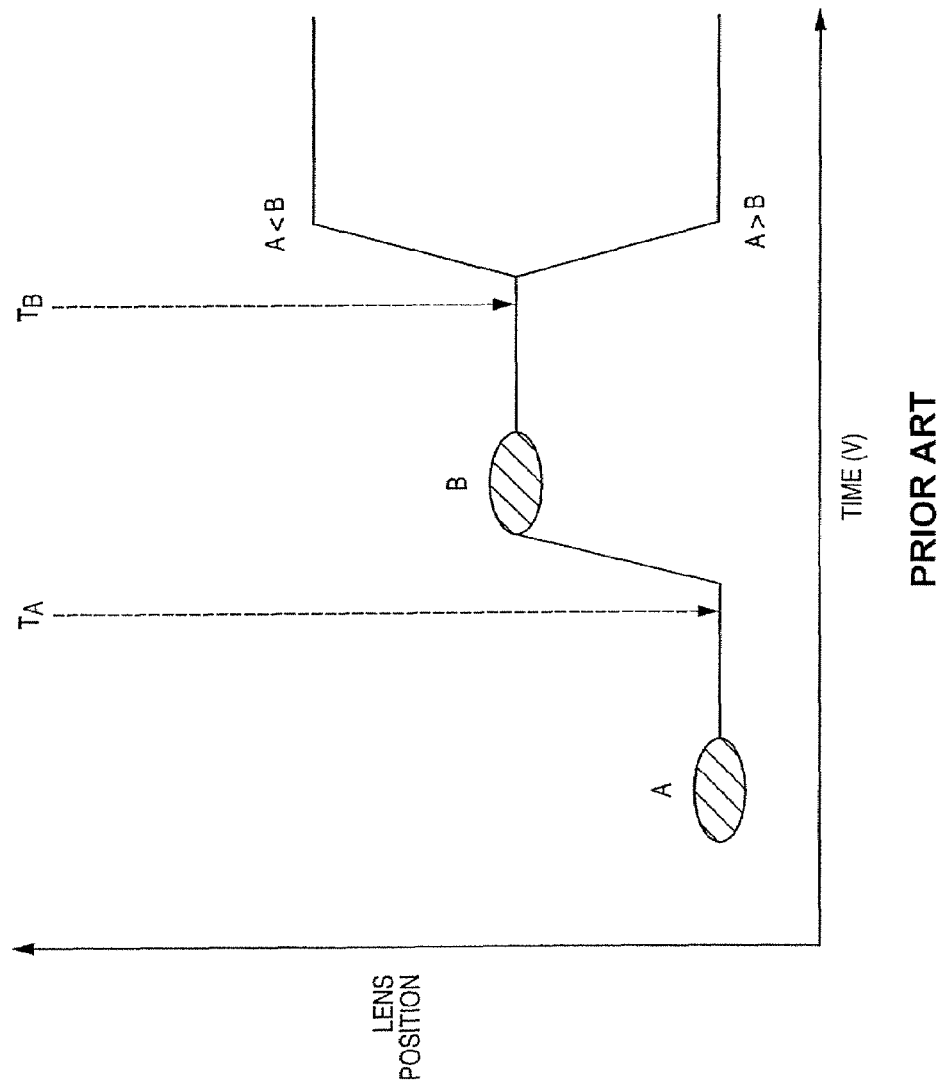
FIG. 5 is a graph for explaining the moving direction of the focus lens in fine driving processing.
Figure 6:
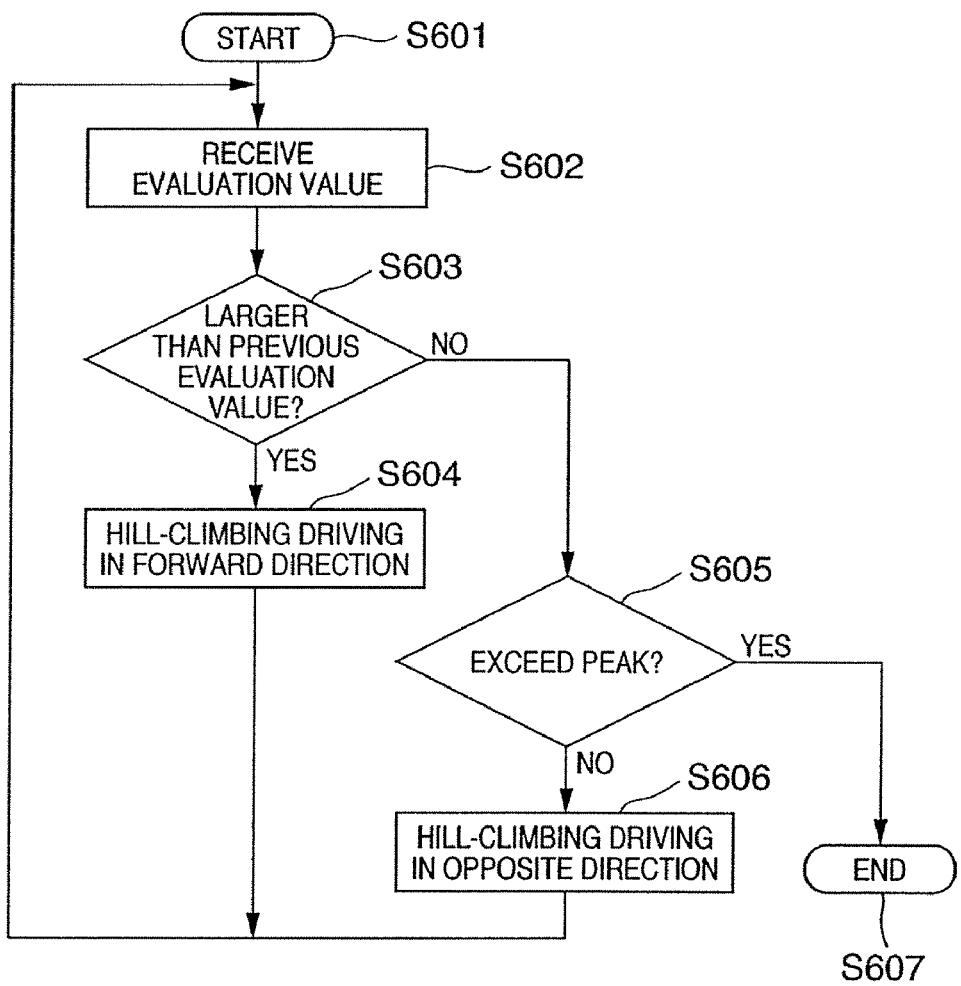
FIG. 6 is a flow chart showing hill-climbing processing in AF processing.
Figure 7:
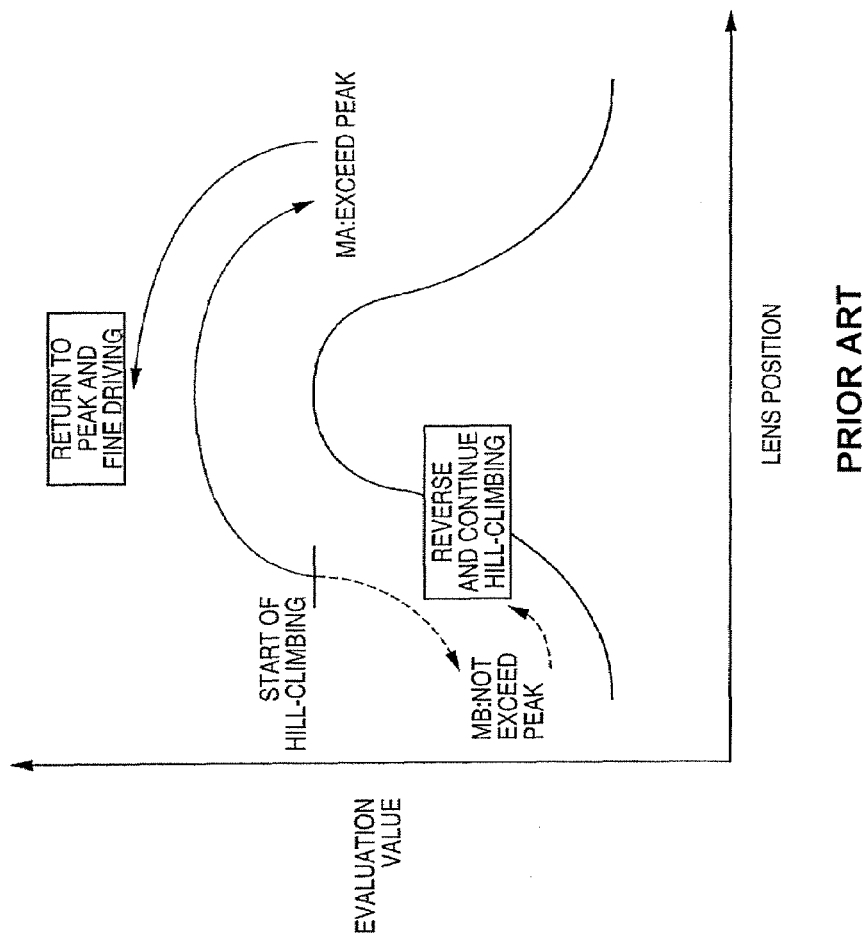
FIG. 7 is a graph for explaining the moving direction of the focus lens in hill-climbing processing.

If the CPU 115a determines in step S1008 that the current lens position is near an in-focus position, i.e., the focus lens 105 is slightly in an out-of-focus state, the CPU 115a executes fine driving in FIG. 4, and searches for a peak position (step S1009). After that, the CPU 115a checks whether the focus lens 105 repeats direction reversal a predetermined number of times or more in almost the same area in fine driving processing of step S1009 (step S1010).

If NO in step S1010, this means that any in-focus position has not been detected yet by fine driving processing of step S1009. The CPU 115a returns to step S1009, and continues fine driving processing.

If YES in step S1010, this means that an in-focus position has been detected by fine driving processing of step S1009. The CPU 115a moves the focus lens 105 to a lens position corresponding to the maximum AF evaluation value obtained by fine driving processing (step S1011). The CPU 115a records a still picture by controlling the camera signal processing circuit 108 and still picture recording device 116 (step S1012), and ends AF processing in still picture photography (step S1013).

If the CPU 115a determines in step S1008 that the current lens position is not near an in-focus position, i.e., the focus lens 105 is greatly in an out-of-focus state, the CPU 115a moves the focus lens 105 to the closest focusing (wide-angle) direction at a high speed (step S1014), and checks whether the AF evaluation value decreases (step S1015). If NO in step S1015, the CPU 115a returns to step S1014, and continues lens moving processing to the closest focusing direction.

If YES in step S1015, the CPU 115a moves the focus lens 105 to the infinity (telephoto) direction at a high speed (step S1016). The CPU 115a monitors changes in AF evaluation value, and checks whether the AF evaluation value exceeds its peak (step S1017). If NO in step S1017, the CPU 115a returns to step S1016, and continues lens moving processing to the infinity direction.

If YES in step S1017, the CPU 115a moves the focus lens 105 to the peak position (in-focus position) (step S1018). The CPU 115a performs processes in step S1109 and subsequent steps.

In the second embodiment, when an in-focus position is considered to be detected by the preceding moving picture AF processing upon reception of a still picture photographing/recording instruction, the focus lens 105 is quickly moved to the in-focus position, AF processing is stopped, and a still picture is recorded. The second embodiment can realize photography free from any shutter time lag.

When the focus lens 105 is not located near an in-focus position (is greatly in an out-of-focus state) in the preceding moving picture AF processing upon reception of a still picture photographing/recording instruction, an in-focus position is immediately detected, the focus lens 105 is moved to the in-focus position, AF processing is stopped, and a still picture is recorded. Even if the focus lens 105 is greatly in an out-of-focus state in release operation for a still picture, a still picture free from any blur can be recorded as quickly as possible.

When the focus lens 105 is located near an in-focus position (is slightly in an out-of-focus state) in the preceding moving picture AF processing upon reception of a still picture photographing/recording instruction, an in-focus position is detected by fine driving, the focus lens 105 is moved to the in-focus position, AF processing is stopped, and a still picture is recorded. Hence, a still picture free from any blur can be quickly recorded.

Third Embodiment

Figure 12:
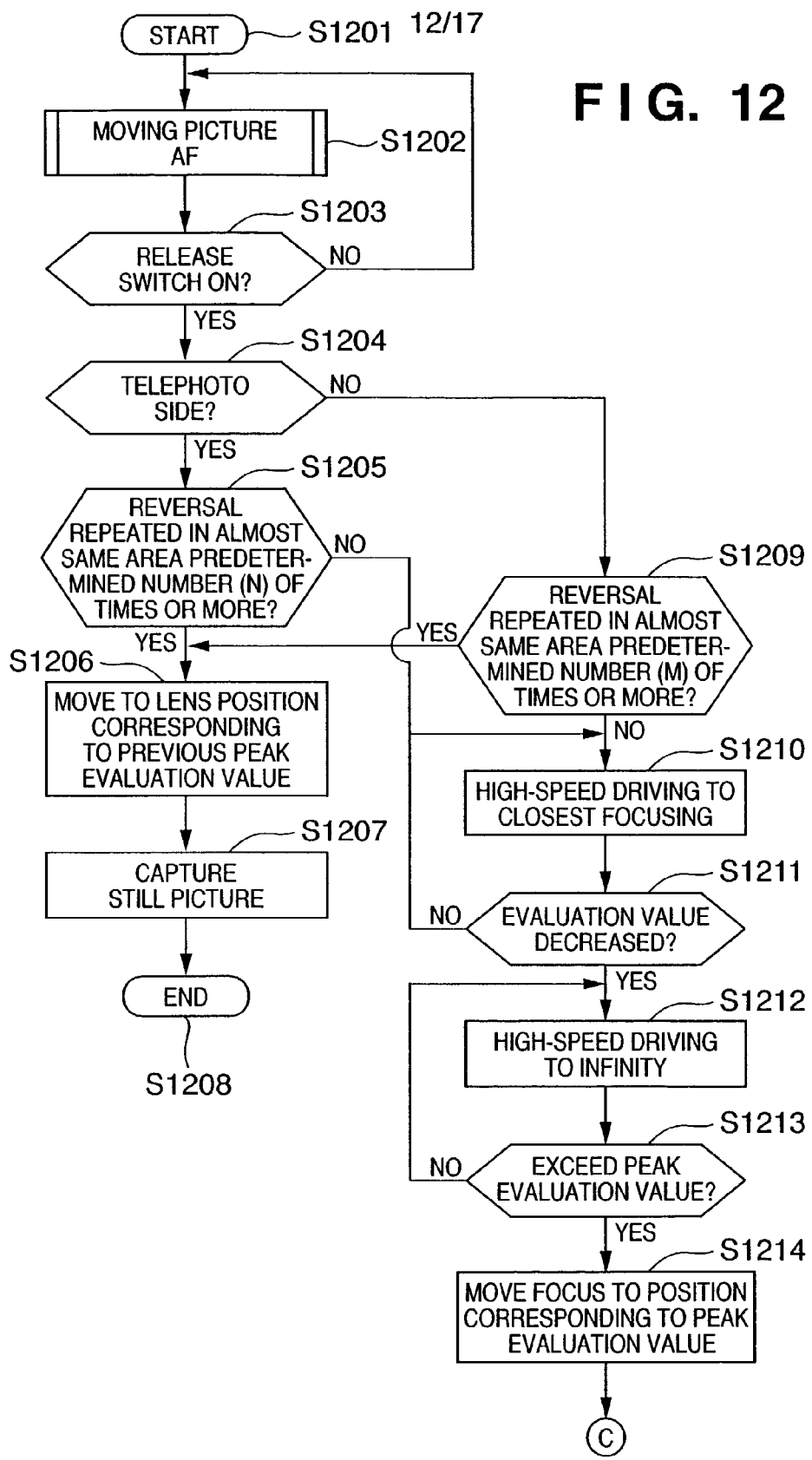
FIG. 12 is a flow chart showing AF processing in still picture photography according to the third embodiment of the present invention.
Figure 13:
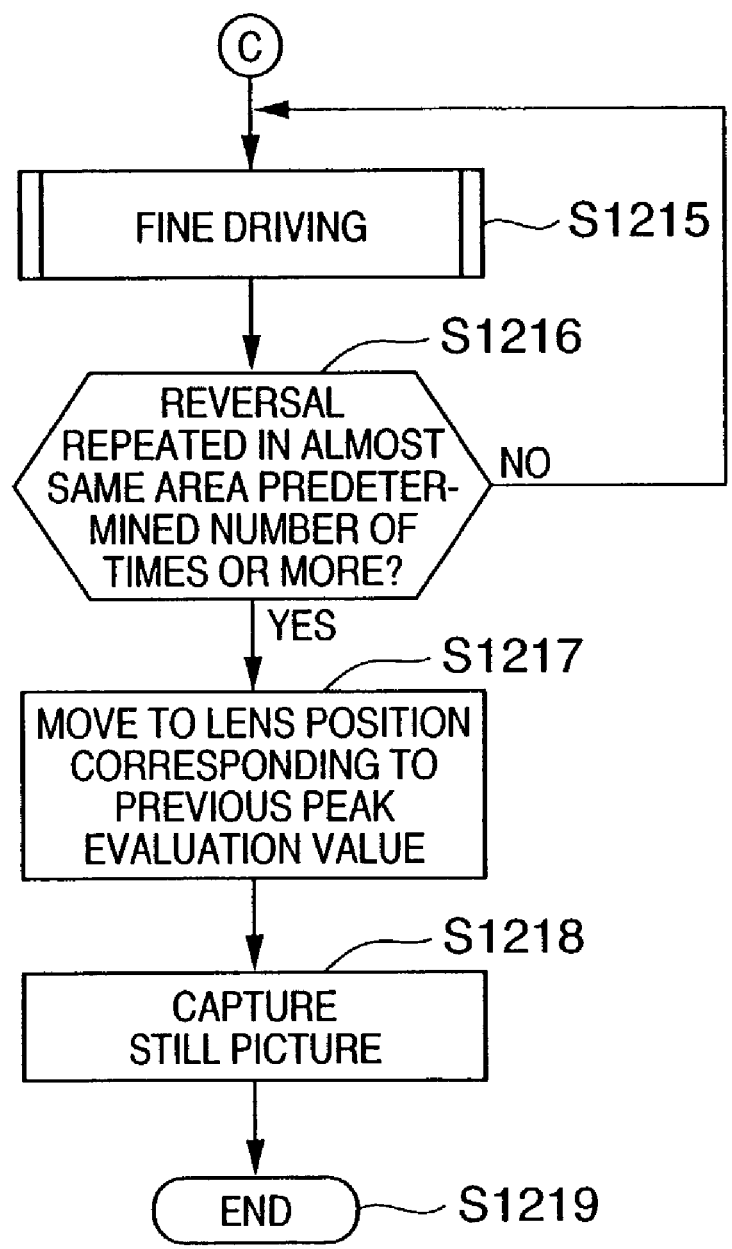
FIG. 13 is a flow chart subsequent to FIG. 12.

AF processing in still picture photography according to the third embodiment will be described with reference to the flow charts of FIGS. 12 and 13.

The third embodiment considers the following situation. In the first and second embodiments, the focus lens 105 is located at an in-focus point with high possibility when the focus lens 105 performs direction reversal a predetermined number of times or more in the same area in moving picture AF processing. For this reason, when a still picture photographing/recording instruction is issued, AF operation is switched in accordance with whether the focus lens 105 repeats direction reversal a predetermined number of times or more in the same area in moving picture AF processing.

The depth of field is shallower on the telephoto side than on the wide-angle side. On the telephoto side, the in-focus range is narrower than on the wide-angle side, and the blur probability is higher. If the number of direction reversal operations for in-focus determination is equal between the telephoto side and the wide-angle side, like the first and second embodiments, a blur occurs on the telephoto side at high possibility with a small number of direction reversal operations for in-focus determination. With a large number of direction reversal operations, a blur hardly occurs on the telephoto side, but the number of in-focus point detection processes is increased on the wide-angle side.

To solve this problem, the third embodiment performs the following AF processing.

More specifically, after AF processing starts (step S1201), a CPU 115*a* of an AF microcomputer 115 performs AF processing in moving picture photography described with reference to FIGS. 3 to 7 (step S1202). The CPU 115*a* checks whether a still picture release switch 118 has been turned on to input a still picture release signal (step S1203). If NO in step S1203, the CPU 115*a* returns to step S1202, and continues AF processing in moving picture photography.

If YES in step S1203, the CPU 115*a* checks whether the current position of a focus lens 105 is on the telephoto side (step S1204). If YES in step S1204, the CPU 115*a* checks whether the focus lens 105 stays in almost the same area for a predetermined time or longer in AF processing in moving picture photography, in other words, whether the focus lens 105 repeats direction reversal a predetermined number of times (N times) or more in almost the same area (step S1205).

If YES in step S1205, this means that an in-focus position has been detected by the preceding AF processing in moving picture photography. The CPU 115*a* moves the focus lens 105 to a position corresponding to the maximum AF evaluation value obtained by the preceding AF processing in moving picture photography (step S1206). The CPU 115*a* records a still picture by controlling a camera signal processing circuit 108 and still picture recording device 116 (step S1207), and ends AF processing in still picture photography (step S1208).

If NO in step S1205, this means that any in-focus position has not been detected yet by the preceding AF processing in moving picture photography. The CPU 115*a* advances to step S1210, and moves the focus lens 105 to the closest focusing (wide-angle) direction at a high speed.

If NO in step S1204, the CPU 115*a* checks whether the focus lens 105 repeats direction reversal a predetermined number of times (M times: N>M) or more in almost the same area (step S1209). By setting N>M, the focus lens 105 is determined to be in focus for a large number of direction reversal operations on the telephoto side where the depth of field is shallow. On the wide-angle side where the depth of field is large, the focus lens 105 is determined to be in focus for a smaller number of direction reversal operations than on the telephoto side. This setting can increase the in-focus/out-of-focus determination precision on both the telephoto and wide-angle sides.

If YES in step S1209, this means that an in-focus position has been detected by the preceding AF processing in moving picture photography, and the CPU 115*a* shifts to step S1206 and subsequent steps. If NO in step S1209, this means that any in-focus position has not been detected yet by the preceding AF processing in moving picture photography. The CPU 115*a* advances to step S1210, and moves the focus lens 105 to the closest focusing (wide-angle) direction at a high speed.

After moving the focus lens 105 to the closest focusing (wide-angle) direction at a high speed, the CPU 115*a* checks whether the AF evaluation value decreases (step S1211). If NO in step S1211, the CPU 115*a* returns to step S1210, and continues lens moving processing to the closest focusing direction.

If YES in step S1211, the CPU 115*a* moves the focus lens 105 to the infinity (telephoto) direction at a high speed (step S1212). The CPU 115*a* monitors changes in AF evaluation value, and checks whether the AF evaluation value exceeds its peak (step S1213). If NO in step S1213, the CPU 115*a* returns to step S1212, and continues lens moving processing to the infinity direction.

If YES in step S1213, the CPU 115*a* moves the focus lens 105 to the peak position (in-focus position) (step S1214). The CPU 115*a* performs fine driving in FIG. 4, and searches for a peak position (step S1215). Fine driving processing is done in consideration of a case in which an actual in-focus position includes an error even if a peak position is detected during high-speed driving, or a case in which an object to be photographed moves.

The CPU 115*a* checks whether the focus lens 105 repeats direction reversal a predetermined number of times (arbitrary in this case) or more in almost the same area in fine driving processing of step S1215 (step S1216).

If NO in step S1216, this means that any in-focus position has not been detected yet by fine driving processing of step S1215. The CPU 115*a* returns to step S1215, and continues fine driving processing.

If YES in step S1216, this means that an in-focus position has been detected by fine driving processing of step S1215. The CPU 115*a* moves the focus lens 105 to a lens position corresponding to the maximum AF evaluation value obtained by fine driving processing (step S1217). The CPU 115*a* records a still picture by controlling the camera signal processing circuit 108 and still picture recording device 116 (step S1218), and ends AF processing in still picture photography (step S1219).

In this manner, the third embodiment can increase the in-focus/out-of-focus determination precision by changing the in-focus determination threshold (number of direction reversal operations) in accordance with a focal length set when a still picture photographing/recording instruction is issued.

Similar to the first embodiment, when an in-focus position is considered to be detected by the preceding moving picture AF processing, the focus lens 105 is quickly moved to the in-focus position, AF processing is stopped, and a still picture is recorded. Photographing free from any shutter time lag can be achieved. If an in-focus position is considered not to be detected by the preceding moving picture AF processing upon reception of a still picture photographing/recording instruction, an in-focus position is immediately detected, the focus lens 105 is moved to the in-focus position, AF processing is stopped, and a still picture is recorded, thereby preventing recording any blurred still picture.

Fourth Embodiment

Figure 14:
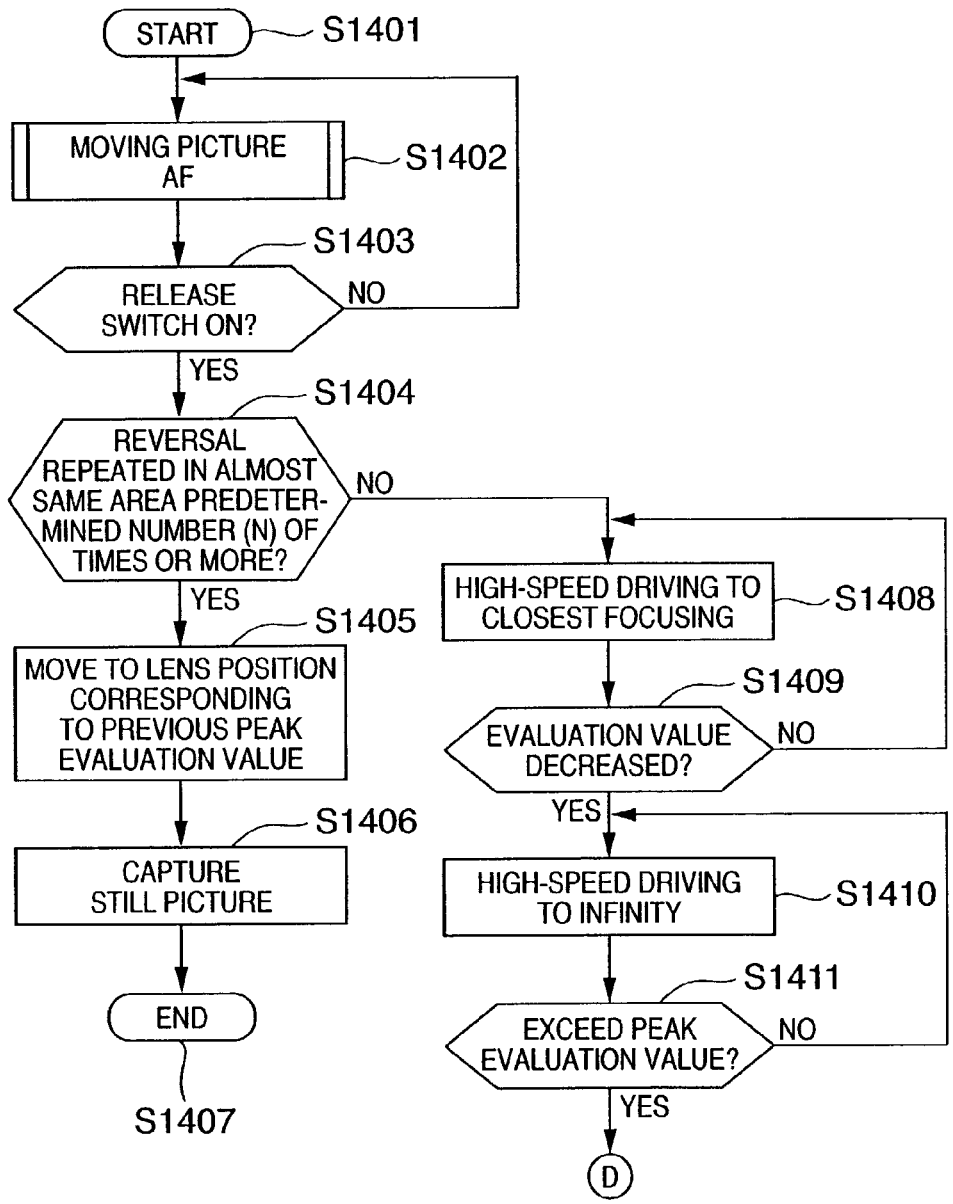
FIG. 14 is a flow chart showing AF processing in still picture photography according to the fourth embodiment of the present invention.
Figure 15:
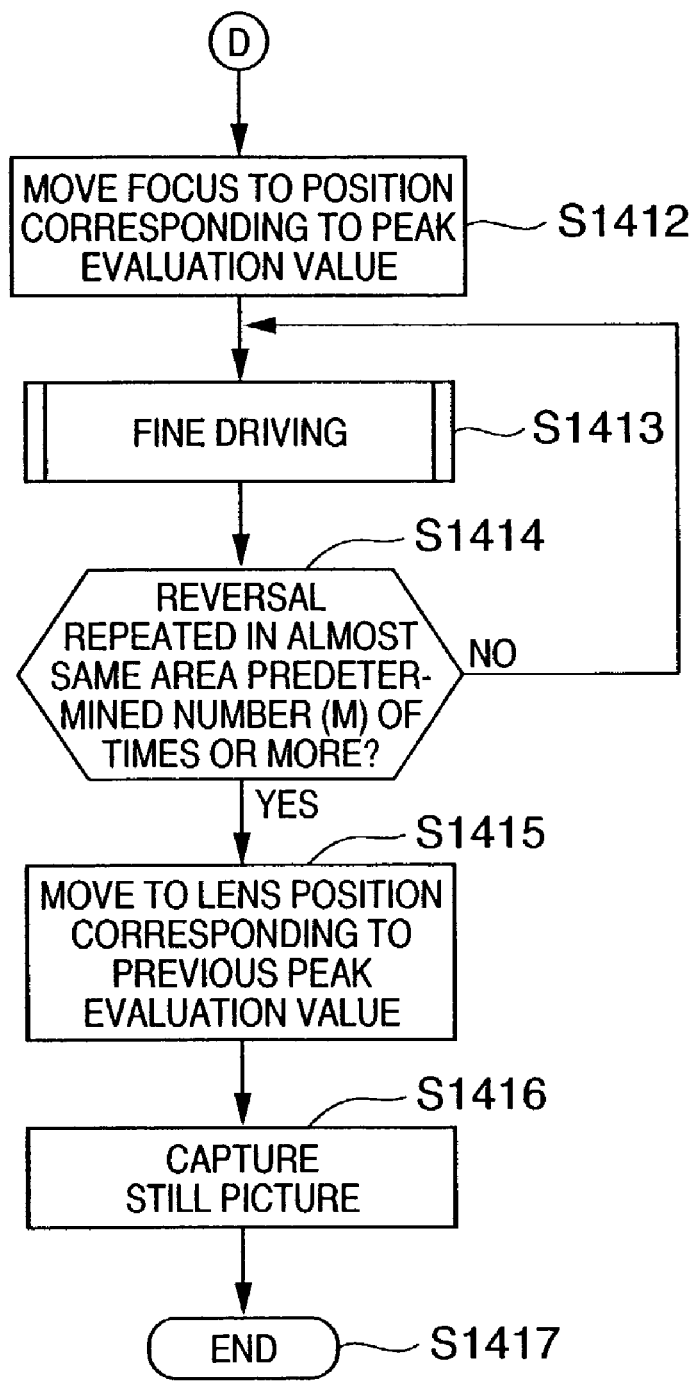
FIG. 15 is a flow chart subsequent to FIG. 14.
Figure 16:
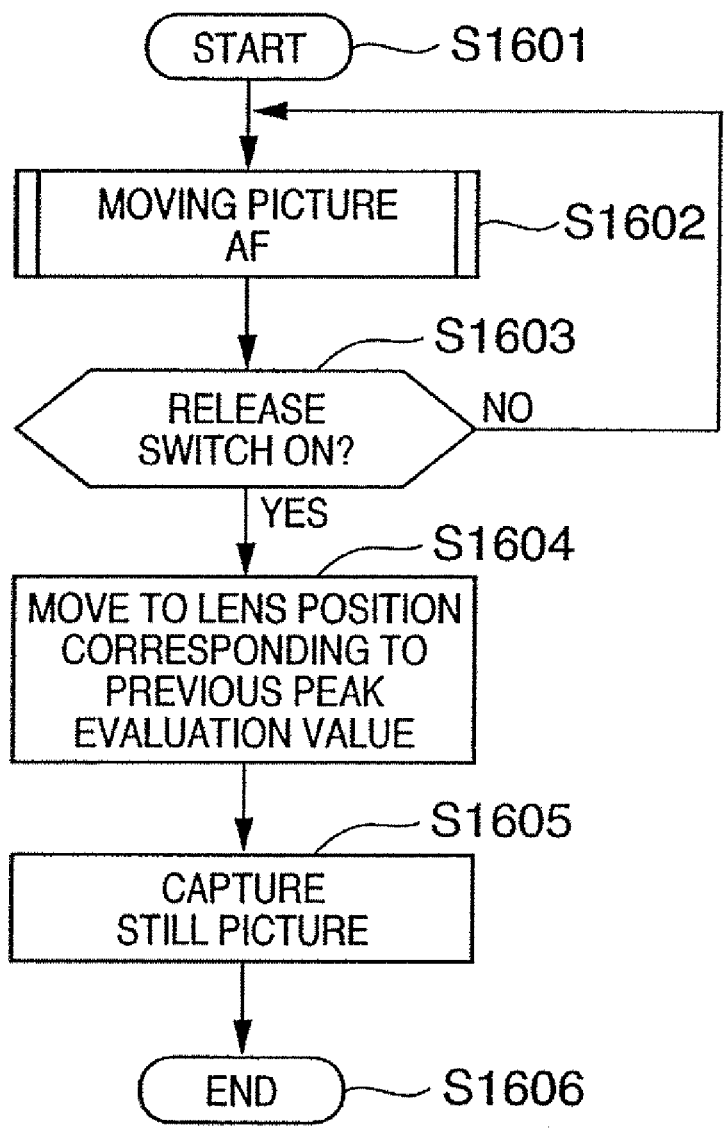
FIG. 16 is a flow chart showing conventional AF processing in still picture photography.
Figure 17:
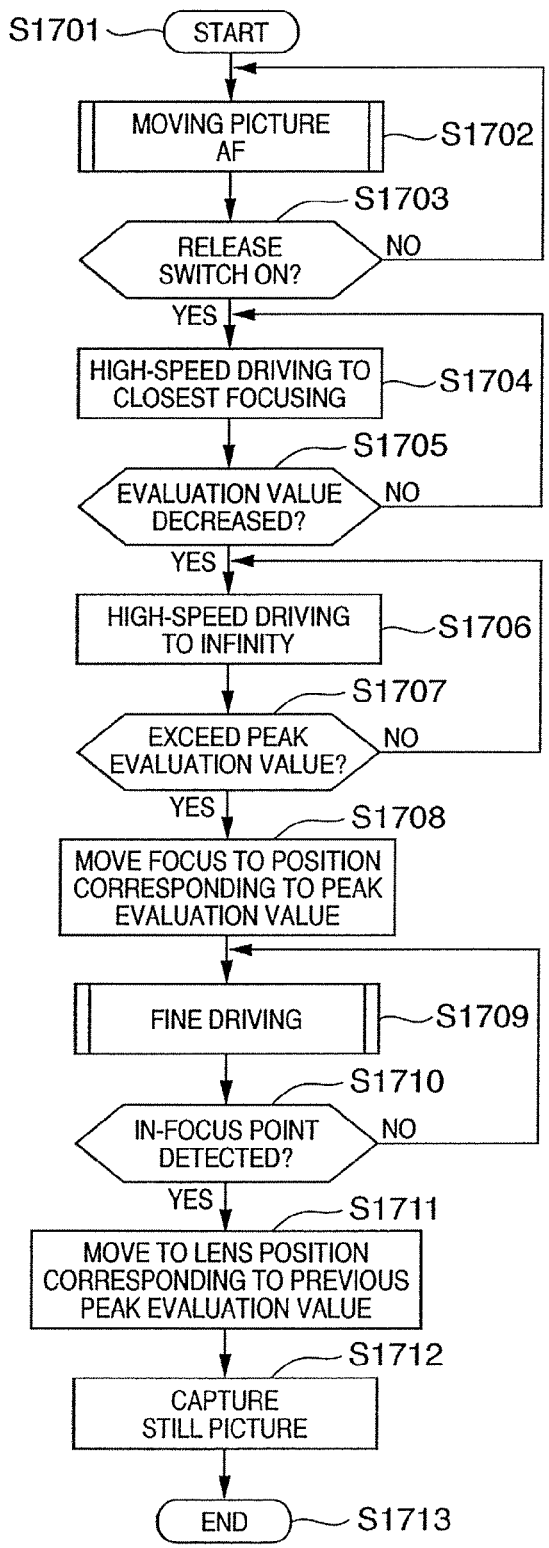
FIG. 17 is a flow chart showing another conventional AF processing in still picture photography.

AF processing in still picture photography according to the fourth embodiment will be described with reference to the flow charts of FIGS. 14 and 15.

The fourth embodiment considers the following situation. In the first and second embodiments, the number of direction reversal operations used for in-focus determination processing performed immediately after a still picture photographing/recording instruction is issued, and the number of direction reversal operations used for in-focus determination processing performed after fine driving processing for newly detecting an in-focus point are set to the same value.

If, however, the number of direction reversal operations for in-focus determination is set to a small value, the in-focus position is erroneously determined and the focus lens may stop in an out-of-focus state in in-focus determination processing performed immediately after a still picture photographing/recording instruction is issued. If the number of direction reversal operations is set to a large value in order to avoid the stop in the out-of-focus state, the time taken to newly detect an in-focus point is prolonged.

To solve this problem, the fourth embodiment performs the following AF processing.

More specifically, after AF processing starts (step S1401), a CPU 115*a* of an AF microcomputer 115 performs AF processing in moving picture photography described with reference to FIGS. 3 to 7 (step S1402). The CPU 115*a* checks whether a still picture release switch 118 has been turned on to input a still picture release signal (step S1403). If NO in step S1403, the CPU 115*a* returns to step S1402, and continues AF processing in moving picture photography.

If YES in step S1403, the CPU 115*a* checks whether a focus lens 105 stays in almost the same area for a predetermined time or longer in AF processing in moving picture photography, in other words, whether the focus lens 105 repeats direction reversal a predetermined number of times (N times) or more in almost the same area (step S1404).

If YES in step S1404, this means that an in-focus position has been detected by the preceding AF processing in moving picture photography. The CPU 115*a* moves the focus lens 105 to a position corresponding to the maximum AF evaluation value obtained by the preceding AF processing in moving picture photography (step S1405). The CPU 115*a* records a still picture by controlling a camera signal processing circuit 108 and still picture recording device 116 (step S1406), and ends AF processing in still picture photography (step S1407).

If NO in step S1404, this means that any in-focus position has not been detected yet by the preceding AF processing in moving picture photography. The CPU 115*a* moves the focus lens 105 to the closest focusing (wide-angle) direction at a high speed (step S1408), and checks whether the AF evaluation value decreases (step S1409). If NO in step S1409, the CPU 115*a* returns to step S1408, and continues lens moving processing to the closest focusing direction.

If YES in step S1409, the CPU 115*a* moves the focus lens 105 to the infinity (telephoto) direction at a high speed (step S1410). The CPU 115*a* monitors changes in AF evaluation value, and checks whether the AF evaluation value exceeds its peak (step S1411). If NO in step S1411, the CPU 115*a* returns to step S1410, and continues lens moving processing to the infinity direction.

If YES in step S1411, the CPU 115*a* moves the focus lens 105 to the peak position (in-focus position) (step S1412). The CPU 115*a* performs fine driving in FIG. 4, and searches for a peak position (step S1413). Fine driving processing is done in consideration of a case in which an actual in-focus position includes an error even if a peak position is detected during high-speed driving, or a case in which an object to be photographed moves.

Then, the CPU 115*a* checks whether the focus lens 105 repeats direction reversal a predetermined number of times (M times: N>M) or more in almost the same area (step S1414).

In this fashion, the number (N times) of direction reversal operations used for in-focus determination processing performed immediately after a still picture photographing/recording instruction is issued is set larger than the number (M times) of direction reversal operations used for in-focus determination processing performed after fine driving processing for newly detecting an in-focus point. This is because the focus lens 105 is located near an in-focus point at higher probability after fine driving processing executed to newly detect an in-focus point than immediately after a still picture photographing/recording instruction is issued.

With N>M, the stop in the out-of-focus state due to erroneous determination can be avoided in in-focus determination processing performed immediately after a still picture photographing/recording instruction is issued. The next in-focus point detection processing can also be quickly achieved.

If NO in step S1414, this means that any in-focus position has not been detected yet by fine driving processing in step S1413. The CPU 115*a* returns to step S1413, and continues fine driving processing.

If YES in step S1414, this means that an in-focus position has been detected by fine driving processing in step S1413. The CPU 115*a* moves the focus lens 105 to a lens position corresponding to the maximum AF evaluation value obtained by fine driving processing (step S1415). The CPU 115*a* records a still picture by controlling the camera signal processing circuit 108 and still picture recording device 116 (step S1416), and ends AF processing in still picture photography (step S1417).

In the fourth embodiment, the number (N times) of direction reversal operations used for in-focus determination processing performed immediately after a still picture photographing/recording instruction is issued is set larger than the number (M times) of direction reversal operations used for in-focus determination processing performed after fine driving processing for newly detecting an in-focus point. This setting can prevent the stop in the out-of-focus state due to erroneous determination in in-focus determination processing performed immediately after a still picture photographing/recording instruction is issued. The next in-focus point detection processing can also be quickly done.

The present invention is not limited to the first to fourth embodiments, and these embodiments can also be appropriately combined. The first to fourth embodiments use the number of reversal moving operations of the focus lens as in-focus information obtained in photographing a moving picture. Alternatively, the high-frequency component of a video signal from a CCD, or an in-focus degree evaluation value based on the ratio of the high-frequency component and a luminance difference component can also be used.

The embodiments of the present invention have been described above. The present invention is not limited to contents disclosed in each embodiment, and can be applied to any apparatus as far as functions disclosed in the appended claims or the functions of arrangements according to the embodiments can be achieved.

For example, the software and hardware arrangements of the above embodiments can be properly replaced.

The above embodiments and their technical elements may be combined, as needed.

In the present invention, arrangements disclosed in the appended claims, or all or some of the arrangements of the embodiments may form one apparatus, an apparatus coupled to another apparatus, or an element which constitutes an apparatus.

The present invention can also be applied to various cameras such as a video camera capable of photographing a still picture, an electronic camera including a digital camera, an interexchangeable photographing lens type camera, a single-lens reflex camera, a lens shutter camera, and a monitor camera, an image sensing apparatus other than the camera, an optical apparatus, another apparatus, an apparatus, method, and computer program applied to the camera, image sensing apparatus, optical apparatus, and another apparatus, and elements which constitute them.

As has been described above, the above-described embodiments enable quickly photographing an in-focus still picture and improve the autofocus performance in photographing a still picture.

As many apparently widely different embodiments of the present invention can be made without departing from the spirit and scope thereof, it is to be understood that the invention is not limited to the specific embodiments thereof except as defined in the appended claims.

What is claimed is:

1. An apparatus capable of executing still picture photography comprising:
   a focus adjusting device configured to detect a position of a focus lens in accordance with movement of the focus lens;
   a designating device which designates the still picture photography;
   a control device which causes said focus adjusting device to operate in one of a first mode in which said focus adjusting device maintains a current in-focus position when said designating device is operated and a second mode in which said focus adjusting device adjusts the position of the focus lens to obtain an in-focus position when said designating device is operated,
   wherein said control device selects the first mode when the focus lens stays within a predetermined focusing area more than a predetermined period of time during a moving image auto focus, and said control device selects the second mode when the focus lens moves out of said predetermined focusing area in the predetermined period of time during said moving image auto focus, and
   wherein said control device determines that the focus lens stays within said predetermined focusing area, when the focus lens repeats direction reversal operations a predetermined number of times larger than a number of direction reversal operations performed after fine driving processing for newly detecting an in-focus position.

2. The apparatus according to claim 1, wherein when the focus lens stayed more than the predetermined period of time in a first area in case of the moving image auto focus, said control device operates the focus adjusting device on a basis of data obtained to perform focus adjustment operation by the focus adjusting device before said designating device is operated.

3. The apparatus according to claim 1, wherein when the focus lens did not stay more than the predetermined time in the predetermined focusing area in case of the moving image auto focus, said control device operates the focus adjusting device on a basis of data obtained to perform focus adjustment operation by the focus adjusting device after said designating device is operated.

4. The apparatus according to claim 1, wherein when the focus lens did not stay more than the predetermined time in the predetermined focusing area in case of the moving image auto focus, said control device operates the focus adjusting device at a first speed, then operates the focus adjusting device at a second speed lower than the first speed, and causes the focus adjusting device to perform focus adjustment operation.

5. The apparatus according to claim 1, wherein said control device causes the focus adjusting device to perform different operations in accordance with whether a focus adjustment state determined by said determining device is an in-focus state at not less than a predetermined level, and a determining device changes the predetermined level on the basis of a focal length.

6. The apparatus according to claim 1, wherein a focus adjustment state obtained by the focus adjusting device upon operating said designating device includes a focus adjustment state in sensing a moving picture.

7. The apparatus according to claim 1, wherein the apparatus includes an image sensing apparatus.

8. The apparatus according to claim 1, wherein the apparatus includes a camera.

9. An apparatus having a moving image function and a still image function, the apparatus comprising:
   a designating device which designates still picture photography; and
   a determining device which determines which mode should be selected from two modes, the two modes including:
      a first mode in which a focus lens repeats direction reversal operations a predetermined number of times larger than a number of direction reversal operations performed after fine driving processing for newly detecting an in-focus position within a narrow range vicinity of a first focus lens position until said designating device is operated, and
      a second mode in which the focus lens is moved until the focus lens reaches a second focus lens position,
   wherein said determining device selects the first mode when the focus lens is in an in-focus position during the moving image function and said determining device selects the second mode when the focus lens is not in the in-focus position during the moving image function.

10. The apparatus according to claim 9, further comprising a deciding device, wherein said deciding device decides, in accordance with whether a focus adjustment state determined by said determining device is an in-focus state at not less than a predetermined level, whether a first focus adjustment operation is used for the still picture photography or a second focus adjustment operation is used for the still picture photography, and said determining device changes the predetermined level in accordance with a focal length.

11. A focus adjustment method, comprising:
   performing one of two operations, said one of two operations being selected from a first mode in which a focus adjusting device maintains a current in-focus position of a focus lens when a designating device, which designates a still picture photography, is operated and a second mode in which the focus adjusting device adjusts a position of the focus lens to obtain an in-focus position of the focus lens when the designating device is operated, wherein the first mode is selected when the focus lens stays within a predetermined focusing area for more than a predetermined period of time during a moving image auto focus, and the second mode is selected when the focus lens moves out of said predetermined focusing area in the predetermined period of time during said moving image auto focus, and wherein said control device determines that the focus lens stays within said predetermined focusing area, when the focus lens repeats direction reversal operations a predetermined number of times larger than a number of direction reversal operations performed after fine driving processing for newly detecting an in-focus position.

12. A focus adjustment method comprising:

determining which mode should be selected from two modes, the two modes including:

a first mode in which a focus lens repeats direction reversal operations a predetermined number of times larger than a number of direction reversal operations performed after fine driving processing for newly detecting an in-focus position within a narrow range vicinity of a first focus lens position until a designating device, which designates a still photography, is operated, and a second mode in which the focus lens is moved until the focus lens reaches a second focus lens position, wherein the first mode is selected when the focus lens is in an in-focus position during a moving image operation and the second mode is selected when the focus lens is not in the in-focus position during said moving image mode.

13. A computer readable medium storing thereon a computer-executable program which when executed by a computer causes the computer to control a focus adjustment process, the program comprising instructions for:

performing one of two operations, said one of two operations being selected from a first mode in which a focus adjusting device maintains a current in-focus position of a focus lens when a designating device, which designates a still picture photography, is operated and a second mode in which the focus adjusting device adjusts a position of the focus lens to obtain an in-focus position of the focus lens when the designating device is operated, wherein the first mode is selected when the focus lens stays within a predetermined focusing area more than a predetermined period of time during a moving image auto focus, and the second mode is selected when the focus lens moves out of said predetermined focusing area in the predetermined period of time during the moving image auto focus, and wherein said control device determines that the focus lens stays within said predetermined focusing area, when the focus lens repeats direction reversal operations a predetermined number of times larger than a number of direction reversal operations performed after fine driving processing for newly detecting an in-focus position.

14. A computer readable medium storing thereon a computer-executable program which when executed by a computer causes the computer to control a focus adjustment process, the program comprising instructions for:

determining which mode should be selected from two modes, the two modes including:

a first mode in which a focus lens repeats direction reversal operations a predetermined number of times larger than a number of direction reversal operations performed after fine driving processing for newly detecting an in-focus position within a narrow range vicinity of a first focus lens position until a designating device, which designates a still picture photography, is operated, and a second mode in which the focus lens is moved until the focus lens reaches a second focus lens position, wherein the first mode is selected when the focus lens is in an in-focus position during a moving image operation and the second mode is selected when the focus lens is not in the in-focus position during the moving image operation.

* * * * *